(12) United States Patent
Herbrich et al.

(10) Patent No.: US 9,413,557 B2
(45) Date of Patent: Aug. 9, 2016

(54) PRICING IN SOCIAL ADVERTISING

(75) Inventors: Ralf Herbrich, Cambridge (GB); Thore Graepel, Cambridge (GB); Yoram Bachrach, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 534 days.

(21) Appl. No.: 12/818,161

(22) Filed: Jun. 18, 2010

(65) Prior Publication Data

US 2011/0313832 A1   Dec. 22, 2011

(51) Int. Cl.
| | |
|---|---|
| *G06Q 30/00* | (2012.01) |
| *H04L 12/58* | (2006.01) |
| *G06Q 30/02* | (2012.01) |
| *G06Q 50/00* | (2012.01) |

(52) U.S. Cl.
CPC ........ *H04L 12/5855* (2013.01); *G06Q 30/0214* (2013.01); *G06Q 30/0273* (2013.01); *G06Q 50/01* (2013.01); *H04L 51/14* (2013.01); *H04L 12/584* (2013.01); *H04L 12/5885* (2013.01)

(58) Field of Classification Search
CPC ............................ G06Q 50/01; G06Q 30/0214
USPC ................... 705/14.16, 319; 709/224
See application file for complete search history.

(56) References Cited

U.S. PATENT DOCUMENTS

| | | | |
|---|---|---|---|
| 6,118,856 A | 9/2000 | Paarsmarkt et al. | |
| 6,487,539 B1 | 11/2002 | Aggarwal et al. | |
| 6,571,295 B1 | 5/2003 | Sidana | |
| 7,099,831 B2 | 8/2006 | Mitsuoka et al. | |
| 7,664,669 B1 | 2/2010 | Adams et al. | |
| 7,664,726 B2* | 2/2010 | Jain et al. | 705/14.16 |
| 7,720,722 B2 | 5/2010 | Ho et al. | |
| 7,761,399 B2 | 7/2010 | Evans | |
| 7,774,229 B1* | 8/2010 | Dernehl et al. | 705/14.16 |
| 7,853,474 B2 | 12/2010 | Ullah | |
| 7,912,751 B1 | 3/2011 | Allos | |
| 7,933,946 B2* | 4/2011 | Livshits et al. | 709/200 |
| 7,949,543 B2 | 5/2011 | Chan | |
| 7,970,661 B1* | 6/2011 | Abraham et al. | 705/26.1 |
| 8,095,124 B2 | 1/2012 | Balia | |
| 8,180,680 B2* | 5/2012 | Leventhal | 705/26.1 |
| 8,285,837 B2* | 10/2012 | Sanford et al. | 709/224 |
| 8,301,493 B2 | 10/2012 | Sanders | |
| 8,375,090 B2 | 2/2013 | Cai et al. | |

(Continued)

OTHER PUBLICATIONS

Yu, Singh, Searching Social Networks, AAMAS '03 Proceedings of the second international joint conference on Automomous agents and multiagent systems (ACM 2003), pp. 65-72.*

(Continued)

*Primary Examiner* — Bennett Sigmond
(74) *Attorney, Agent, or Firm* — Tom Wong; Micky Minhas

(57) ABSTRACT

Online recommendations are tracked through a forwarding service. The forwarding service can provide such statistics to an ad service, which can provide incentives to the recommending user and a consuming user. Example incentives may include an accumulation of points by the recommending user, a discount to the consuming user if a purchase is made in response to the recommendation, etc. To determine how much of an incentive each participant in the recommendation flow receives, a graph is created to model the recommendation flow and incentives are allocated using a cooperative game description based on this graph that associates each participant with a power index that represents that participants share of the incentive.

20 Claims, 8 Drawing Sheets

(56) References Cited

U.S. PATENT DOCUMENTS

| | | | |
|---|---|---|---|
| 8,386,599 B2 | 2/2013 | Fomitchev | |
| 8,448,057 B1 | 5/2013 | Sugnet et al. | |
| 8,515,936 B2 | 8/2013 | Hansen et al. | |
| 8,700,618 B2 | 4/2014 | Evans et al. | |
| 2001/0020231 A1 | 9/2001 | Perri et al. | |
| 2001/0037205 A1 | 11/2001 | Joao | |
| 2002/0004742 A1* | 1/2002 | Willcocks et al. | 705/14 |
| 2002/0042830 A1 | 4/2002 | Bose et al. | |
| 2002/0069116 A1 | 6/2002 | Ohashi et al. | |
| 2002/0165955 A1 | 11/2002 | Johnson et al. | |
| 2003/0105669 A1* | 6/2003 | Tsuchiya | 705/14 |
| 2003/0225609 A1 | 12/2003 | Klipfell, III | |
| 2004/0006598 A1 | 1/2004 | Bargagli Damm et al. | |
| 2004/0044566 A1 | 3/2004 | Bostelmann et al. | |
| 2004/0204990 A1* | 10/2004 | Lee et al. | 705/14 |
| 2005/0125287 A1* | 6/2005 | Sureka et al. | 705/14 |
| 2005/0216338 A1* | 9/2005 | Tseng et al. | 705/14 |
| 2005/0223093 A1 | 10/2005 | Hanson et al. | |
| 2005/0228899 A1 | 10/2005 | Wendkos et al. | |
| 2005/0235036 A1 | 10/2005 | Nielsen et al. | |
| 2006/0041477 A1 | 2/2006 | Zheng | |
| 2006/0059113 A1* | 3/2006 | Kuznar | G06N 3/004 706/45 |
| 2006/0085259 A1 | 4/2006 | Nicholas et al. | |
| 2006/0224729 A1* | 10/2006 | Rowe et al. | 709/224 |
| 2006/0282328 A1 | 12/2006 | Gerace | |
| 2007/0067271 A1 | 3/2007 | Lu | |
| 2007/0088312 A1 | 4/2007 | Wang | |
| 2007/0121843 A1 | 5/2007 | Atazky et al. | |
| 2007/0204308 A1 | 8/2007 | Nicholas et al. | |
| 2007/0260605 A1 | 11/2007 | Norman et al. | |
| 2008/0005072 A1 | 1/2008 | Meek et al. | |
| 2008/0033813 A1 | 2/2008 | Khachatryan | |
| 2008/0086369 A1 | 4/2008 | Kiat et al. | |
| 2008/0103900 A1 | 5/2008 | Flake et al. | |
| 2008/0103907 A1* | 5/2008 | Maislos | G06F 17/30867 705/14.54 |
| 2008/0154915 A1 | 6/2008 | Flake et al. | |
| 2008/0162260 A1* | 7/2008 | Rohan | G06Q 30/02 705/14.4 |
| 2008/0168099 A1* | 7/2008 | Skaf | G06Q 30/02 |
| 2008/0189169 A1* | 8/2008 | Turpin | G06Q 30/02 705/7.33 |
| 2008/0195466 A1 | 8/2008 | Wright | |
| 2008/0222614 A1* | 9/2008 | Chilimbi et al. | 717/130 |
| 2008/0244655 A1 | 10/2008 | Mattila | |
| 2008/0256233 A1* | 10/2008 | Hall et al. | 709/224 |
| 2008/0262920 A1 | 10/2008 | O'Neill et al. | |
| 2009/0003355 A1* | 1/2009 | Jain et al. | 370/400 |
| 2009/0018923 A1 | 1/2009 | Chen et al. | |
| 2009/0070228 A1 | 3/2009 | Ronen | |
| 2009/0132365 A1 | 5/2009 | Gruenhagen et al. | |
| 2009/0144447 A1 | 6/2009 | Wittig et al. | |
| 2009/0158172 A1 | 6/2009 | Ramsaur et al. | |
| 2009/0177527 A1* | 7/2009 | Flake | G06Q 10/10 705/14.16 |
| 2009/0187537 A1 | 7/2009 | Yachin et al. | |
| 2009/0210480 A1* | 8/2009 | Sivasubramaniam et al. | 709/203 |
| 2009/0228561 A1 | 9/2009 | Finkeldey | |
| 2009/0248493 A1* | 10/2009 | Flake | G06Q 10/10 705/14.16 |
| 2009/0248516 A1 | 10/2009 | Gross | |
| 2009/0259547 A1 | 10/2009 | Clopp | |
| 2010/0042487 A1 | 2/2010 | Barazani | |
| 2010/0088148 A1 | 4/2010 | Presswala et al. | |
| 2010/0125490 A1 | 5/2010 | Kiciman et al. | |
| 2010/0145777 A1* | 6/2010 | Ghosh et al. | 705/14.1 |
| 2010/0153185 A1* | 6/2010 | Ghosh et al. | 705/10 |
| 2010/0179856 A1* | 7/2010 | Paretti et al. | 705/10 |
| 2010/0223119 A1 | 9/2010 | Klish | |
| 2010/0228614 A1* | 9/2010 | Zhang | G06Q 10/10 705/14.16 |
| 2010/0228631 A1* | 9/2010 | Zhang et al. | 705/14.66 |
| 2010/0250352 A1* | 9/2010 | Moore | 705/14.16 |
| 2010/0268574 A1* | 10/2010 | Butcher | G06Q 10/10 705/14.53 |
| 2010/0268584 A1 | 10/2010 | Pullur et al. | |
| 2010/0313141 A1 | 12/2010 | Yu et al. | |
| 2010/0318611 A1* | 12/2010 | Curtin et al. | 709/206 |
| 2011/0035283 A1 | 2/2011 | Min et al. | |
| 2011/0035291 A1 | 2/2011 | Jones | |
| 2011/0093334 A1* | 4/2011 | Wood | 705/14.53 |
| 2011/0106597 A1 | 5/2011 | Ferdman et al. | |
| 2011/0145052 A1 | 6/2011 | Lin | |
| 2011/0161159 A1* | 6/2011 | Tekiela et al. | 705/14.41 |
| 2011/0178889 A1* | 7/2011 | Abraham | G06Q 10/10 705/26.1 |
| 2011/0196725 A1* | 8/2011 | Malcolmson et al. | 705/14.16 |
| 2011/0196863 A1 | 8/2011 | Marcucci et al. | |
| 2011/0282734 A1 | 11/2011 | Zurada | |
| 2011/0313833 A1 | 12/2011 | Graepel et al. | |
| 2012/0010929 A1 | 1/2012 | Kolli | |
| 2012/0089446 A1 | 4/2012 | Gupta et al. | |
| 2012/0089581 A1 | 4/2012 | Gupta et al. | |
| 2014/0032293 A1 | 1/2014 | Donlan | |

OTHER PUBLICATIONS

Janderson., "Website Optimisation for Social Networking and Referral Traffic", Retrieved at http://hubpages.com/hub/Website-Optimisation-for-Social-Networking-and-Referral-Traffic, Retrieved Date: Jun. 14, 2010, pp. 5.

"Twitter Development Talk", Retrieved at http://groups.google.com/group/twitter-development-talk/browse_thread/thread/14d5474c13ed84aa, Retrieved Date: Oct. 5, 2010, pp. 14.

Cutler, Kim-Mai., "Why the Facebook-Amazon.com integration is bigger than you think", Retrieved at http://social.venturebeat.com/2010/07/27/facebook-amazon/ >>, Jul. 27, 2010, pp. 12.

Leskovec, et al., "Patterns of Influence in a Recommendation Network", Retrieved at << http://www-2.cs.cmu.edu/~jure/pubs/cascades-pakdd06e.pdf >>, In Pacific-Asia Conference on Knowledge Discovery and Data Mining (PAKDD), 2005, pp. 10.

Dütting, et al., "On the Pricing of Recommendations and Recommending Strategically", Retrieved at << http://arxiv.org/PS_cache/arxiv/pdf/0911/0911.1619v1.pdf >>, Nov. 9, 2009, pp. 1-12.

Bergemann, et al., "Optimal Pricing with Recommender Systems", Retrieved at << http://citeseerx.ist.psu.edu/viewdoc/download-?doi=10.1.1.99.2904&rep=rep1&type=pdf >>, Mar. 2006, pp. 13.

Arthur, et al., "Pricing strategies for viral marketing on Social Networks", Retrieved at <<http://arxiv.org/PS_cache/arxiv/pdf/0902/0902.3485v1.pdf >>, Feb. 20, 2009, pp. 1-16.

Ohta, et al., "Anonymity-proof Shapley Value: Extending Shapley Value for Coalitional Games in Open Environments", Retrieved at << http://citeseerx.ist.psu.edu/viewdoc/download?doi=10.1.1.127.5107&rep=rep1&type=pdf>>, International Conference on Autonomous Agents, Proceedings of the 7th international joint conference on Autonomous agents and multiagent systems, vol. 2, May 12-16, 2008, pp. 8.

Bredel, Matthew., "PURL Wisdom—Using Your Subdomain as a Variable", Retrieved at << http://www.matthewbredel.com/963/using-your-subdomain-as-a-variable.html >>, Sep. 2, 2009, pp. 7.

Kwon, et al., "NAMA: A Context-aware Multi-agent based Web Service Approach to Proactive Need Identification for Personalized Reminder Systems", Retrieved at << http://home.postech.ac.kr/~blissray/files/paper/ESWA_NAMA.pdf >>, Expert Systems with Applications, 2005, pp. 17-32.

"Personalized URL System for your Website", Retrieved at <<http://www.customerparadigm.com/index/9/Personalized%20URL%20System.php >>, Retrieved Date: Mar. 31, 2010, pp. 3.

Printz, et al., "Don't Let Mistakes with Personalized URLs Blow Up a Perfectly Good Marketing Campaign", Retrieved at << http://www.ondemandexpo.com/on-demand-newsletter/newsletter-article-december-dont-let-mistakes-with-personalized-urls-blow-up-a- >>, Retrieved Date: Apr. 1, 2010, pp. 6.

"Personalized URL (PURL) Strategy Guide", Retrieved at << http://www.slideshare.net/L2Fuse/personalized-url-purl-strategy-guide >>, Retrieved Date: Apr. 1, 2010, pp. 3.

(56) References Cited

OTHER PUBLICATIONS

Bachrach, et al., "Approximating Power Indices", Proc. of 7th Int. Conf. on Autonomous Agents and Multiagent Systems (AAMAS 2008), ,May 12-16, 2008, pp. 943-950.
Fatima, et al., "A Randomized Method for the Shapley Value for the Voting Game", Proceedings of the 6th international joint conference on Autonomous agents and multiagent systems May 14-18, 2007, pp. 8.
Bilbao, et al., "Generating functions for computing power indices efficiently", retrieved at <www.esi2.us.es/~mbilbao/pdffiles/generat.pdf>, vol. 8, No. 2 / Dec. 2000, pp. 1-18.
Matsui, et al., "A Survey of Algorithms for Calculating Power Indices of Weighted Majority Games", Journal of the Operations Research, vol. 43, No. 1, Mar. 2000, pp. 16.
Bilbao, et al., "The Banzhaf power index on convex geometries", Mathematical Social Sciences 36 (1998), pp. 157-173.
Dictionary.com definition of "device", Available at http://dictionary.reference.com/browse/device?s=t&path=/, Printed May 10, 2013.
"Response to Final Office Action Dated Dec. 26, 2014," Filed Apr. 21, 2015 From U.S. Appl. No. 12/818,170, 16 pages.
Non-Final Office Action, Mailed May 24, 2012 from U.S. Appl. No. 12/818,170, 15 pages.
Response Filed Jul. 13, 2012 to the Non-Final Office Action Mailed May 24, 2012 From U.S. Appl. No. 12/818,170, 16 pages.
Final Office Action, Mailed Nov. 7, 2012 from U.S. Appl. No. 12/818,170, 26 pages.
Response Filed Jan. 23, 2013 to the Final Office Action Mailed Nov. 7, 2012 from U.S. Appl. No. 12/818,170, 15 pages.
Non-Final Office Action, Mailed May 1, 2014 from U.S. Appl. No. 12/818,170, 28 pages.
Response Filed Sep. 2, 2014 to the Non-Final Office Action Mailed May 1, 2014 from U.S. Appl. No. 12/818,170, 14 pages.
Final Office Action Mailed Dec. 26, 2014 from U.S. Appl. No. 12/818,170, 34 pages.
Non-Final Office Action Mailed Oct. 12, 2012 from U.S. Appl. No. 12/899,566, 23 pages.
Response Filed Jan. 3, 2013 to the Non-Final Office Action Mailed Oct. 12, 2012 from U.S. Appl. No. 12/899,566, 13 pages.
Final Office Action Mailed May 16, 2013 from U.S. Appl. No. 12/899,566, 23 pages.
Response Filed Sep. 16, 2013 to the Final Office Action Mailed May 16, 2013 from U.S. Appl. No. 12/899,566, 14 pages.
Non-Final Office Action Mailed Aug. 11, 2014 from U.S. Appl. No. 12/899,566, 32 pages.
Non-Final Office Action Mailed Jun. 19, 2012 from U.S. Appl. No. 12/899,569, 12 pages.
Response Filed Jul. 30, 2012 to the Non-Final Office Action Mailed Jun. 19, 2012 from U.S. Appl. No. 12/899,569, 12 pages.
Final Office Action Mailed Oct. 17, 2012 from U.S. Patent Application No. 12/899,569, 17 pages.
Response filed Jan. 17, 2013 to the Final Office Action Mailed Oct. 17, 2012 from U.S. Appl. No. 12/899,569, 15 pages.
Non-Final Office Action Mailed Sep. 5, 2014 from U.S. Appl. No. 12/899,569, 20 pages.
Response filed Mar. 2, 2015 to the Non-Final Office Action Mailed Sep. 5, 2014 from U.S. Appl. No. 12/899,569, 17 pages.
Final Office Action Mailed Mar. 27, 2015 from U.S. Appl. No. 12/899,569, 22 pages.
Non-Final Office Action mailed Jul. 24, 2015 from U.S. Appl. No. 12/818,170, 40 pages.
Non-Final Office Action mailed Oct. 12, 2012 from U.S. Appl. No. 12/899,566, 32 pages.

\* cited by examiner

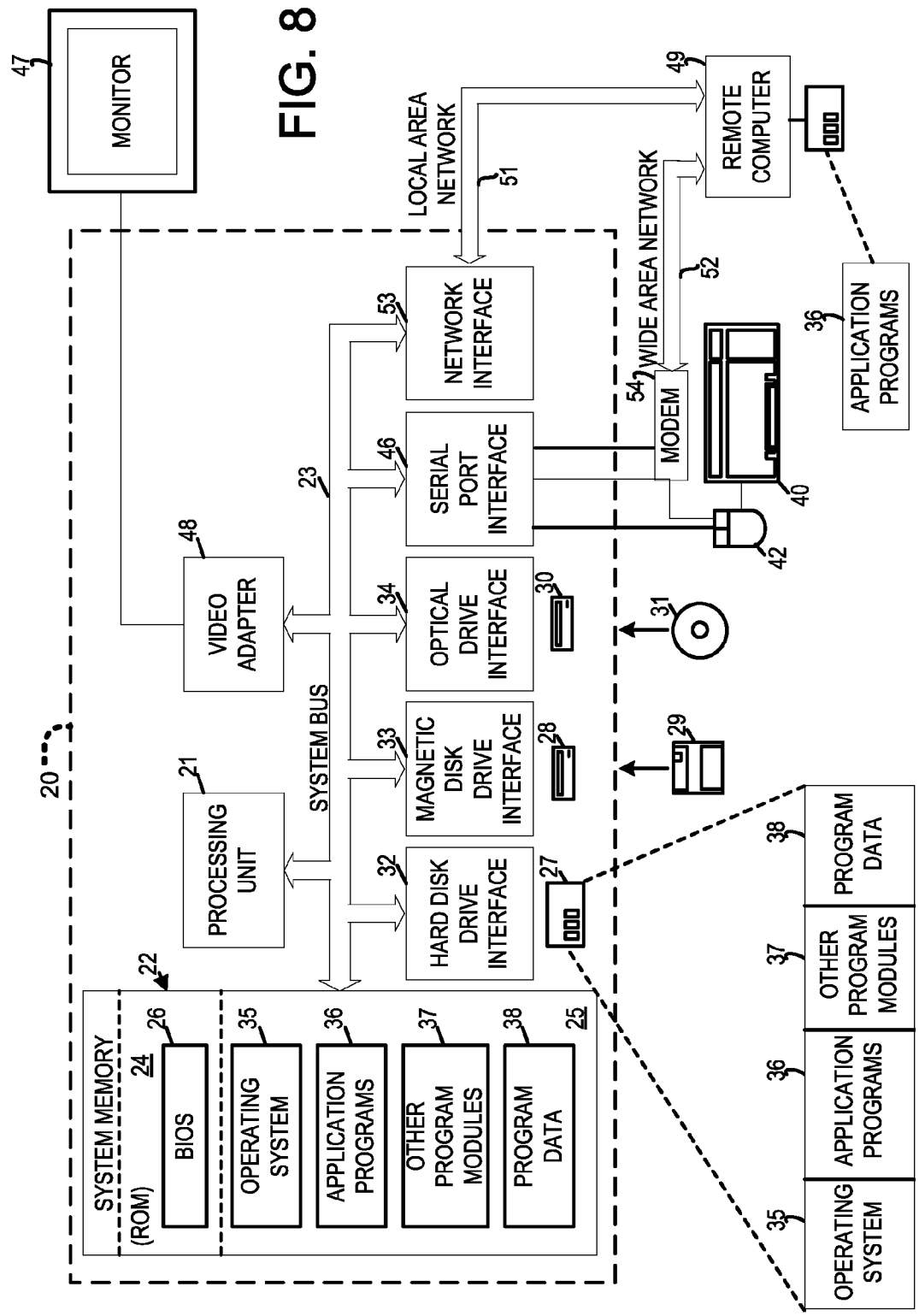

PRICING IN SOCIAL ADVERTISING

CROSS-REFERENCE TO RELATED APPLICATIONS

The present application is related to U.S. patent application Ser. No. 12/818,170, entitled "Reconstructing the Flow of Online Recommendations" and filed on Jun. 18, 2010, specifically incorporated by reference herein for all that it discloses or teaches.

BACKGROUND

Personal recommendations and word-of-mouth advertising can greatly influence an individual's purchase decision. Generally, a consumer is more likely to purchase a product or service based on referral from someone they know and/or trust than based on an independent advertisement. With the arrival of online communication services, such as email, blogs, microblogging services, social networking services, and electronic commerce sites, personal recommendations and word-of-mouth advertising proliferate in an online fashion. Providing incentives to recommending users and to those users who consume recommendations (e.g., shop and/or purchase on the basis of such recommendations) can amplify the effect of such advertising. However, fairly yet effectively incentivizing the participants in such advertising (e.g., recommending and recommended users) to encourage recommendations is a challenging problem.

SUMMARY

Implementations described and claimed herein address the foregoing problems by fairly allocating incentives to participants in a recommendation flow. In one example, a user may send an email to a friend recommending a product specified at a particular web site (e.g., identified by a Uniform Resource Identifier (URI) embedded in the email). Before sending the email containing the URI, the user submits the URI to a forwarding service, which associates the recommended URI with an identifier of the recommending user and returns a new URI that is mapped to the original URI and to the recommending user. The recommending user can then recommend the web site by forwarding the new URI to the friend. If the friend selects the new URI to review the web site, the forwarding service records the friend's decision to review the web site and directs the friend to the recommended web site. The forwarding service maintains a database of recommendations made by the recommending user, recommendations consumed (e.g., acted on) by the friend, whether the friend visited the recommended web site, etc.

In this manner, the forwarding service can provide such statistics to an ad service, which can provide incentives to the recommending user and the friend. Example incentives may include an accumulation of points by the recommending user, a discount to the friend if a purchase is made in response to the recommendation, etc. Further, a recommendation flow may include multiple recommendations resulting in or contributing to one or more purchases. To determine how much of an incentive each participant in the recommendation flow receives, a graph is created to model the recommendation flow and incentives are allocated using a cooperative game description based on this graph. The game description is processed to associate each participant with a power index that represents that participant's share of the incentive.

Other implementations are also described and recited herein.

BRIEF DESCRIPTIONS OF THE DRAWINGS

FIG. 8 illustrates an example system that may be useful in implementing the described technology.

DETAILED DESCRIPTIONS

As an initial matter, a URI is an example of a resource identifier and represents a string of characters used to identify a resource on a network. A universal resource locator (URL) is an example type of URI that identifies both a network resource and a means of accessing the network resource. For example, the best-known example of a URL is the "address" of a web page on the World Wide Web, such as "http://www.microsoft.com", wherein the URI scheme "http" implies that a representation of the identified network resource may be obtained via HTTP from a network host named "www.microsoft.com". A universal resource name (URN) is another example type of URI.

Figure 1:
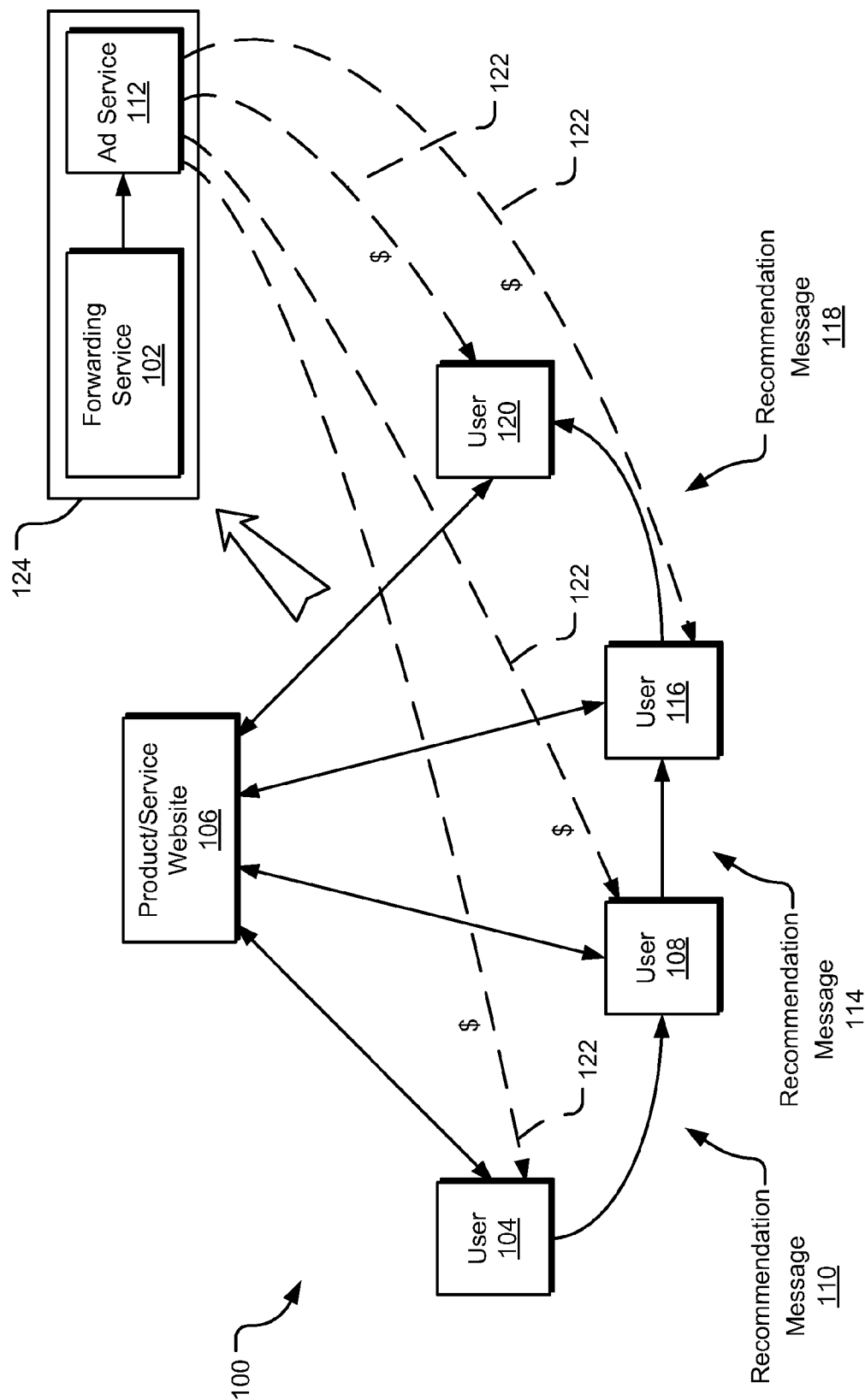
FIG. 1 illustrates an example recommendation flow employing a forwarding service for recommendations and an ad service for allocating incentives.

FIG. 1 illustrates an example recommendation flow 100 employing a forwarding service 102 for recommendations and an ad service 112 for allocating incentives. In the illustrated example, a user 104 visits a network resource (such as a product/service website 106, a web service, a file transfer protocol (FTP) resource, a data storage system, etc.) and wishes to recommend it to a friend (e.g., a user 108). The recommending user 104, therefore, transfers the URI of the network resource into a recommendation message 110 to send it to the consuming user 108. Note: Users are designated in the figures by labeled blocks and are intended to represent the individual users and/or their computing systems.

Prior to triggering the transmission of the recommendation message 110 to the user 108, the user 104 submits the URI to the forwarding service 102, in a manner similar to using a URL shortening service. On the basis of this submission, the forwarding service 102 also receives a user identifier (UserID) of the user 104. Given the UserID and the URI, the forwarding service 102 generates a trackable recommendation identifier (e.g., another URI), which it returns to the user 104. The forwarding service 102 maintains a mapping between the originally received URI and the trackable recommendation identifier and another mapping between the UserID and the trackable recommendation identifier. These mappings may be unidirectional (e.g., from trackable recommendation identifier to original URI and/or UserID) or bidirectional (e.g., between trackable recommendation identifier to original URI and between trackable recommendation identifiers to UserID. Thereafter, upon receipt of the trackable recommendation identifier, the user 104 can trigger transmission of the recommendation message 110 containing the trackable recommendation identifier to the user 108.

Upon receiving the recommendation message 110, the user 108 can trigger the trackable recommendation identifier from the recommendation message 110 (e.g., selecting it, selecting a submission item from a context sensitive menu, sending the trackable recommendation identifier to a submission service, etc.), thereby submitting it to the forwarding service 102 for consumption (e.g., translation back into the original URI to the recommended network resource). In one implementation, a UserID of the user 108 may also be submitted to the forwarding service 102, which can create a user mapping between the trackable recommendation identifier and the UserID of the user 108.

In one implementation, the forwarding service 102 refers to recorded mappings of trackable recommendation identifiers and determines the original URI associated with the received trackable recommendation identifier, returning the original URI back to the user 108. Upon receipt of the original URI, the user 108 can select the original URI to navigate to or otherwise access the network resource (e.g., the product/service website 106) identified by the original URI. In another implementation, the user 108 is redirected or given access directly to the network resource without returning the original URI to the user 108.

In one implementation, the submission of the original URI to the forwarding service 102 credits the user 104 with an attempted recommendation, which may be rewarded by some measure maintained by the forwarding service 102, the ad service 112, or some other means. The ad service 112 is a component of the overall recommendation system that can query the forwarding service 102 for recommendation data relating to a user or a URI and take appropriate action. For example, the ad service 112 (or the forwarding service 102) can analyze such recommendation data and credit the user 104 with points toward a product or service rewards program, with a monetary credit, or with some other incentive. The forwarding service 102 and the ad service 112 are shown as residing in the same server 124, but it should be understood that the forwarding service 102, the ad service 112, and/or their components may be distributed over multiple computing systems.

Additionally, or in an alternative implementation, the submission of the trackable recommendation identifier to the forwarding service by the user 108 may also result in the user 104 receiving credit for a consumed recommendation. For example, because the forwarding service 102 maintains a user mapping between the trackable recommendation identifier and the UserID of the user 104, when the forwarding service 102 receives the submission from the user 108, the forwarding service 102 can find this user mapping and credit the user 104 with some benefit (e.g., points, credit, etc.).

Additionally, or in an alternative implementation, the submission of the trackable recommendation identifier and the UserID of the user 108 to the forwarding service by the user 108 may result in the user 108 receiving some benefit. For example, because the forwarding service 102 can maintain a mapping between the trackable recommendation identifier and the UserID of the user 108, when the forwarding service 102 receives the submission from the user 108, it can find this mapping and credit the user 108 with some benefit (e.g., points, credits, discounts, etc.). The UserID of the user 108 may also be passed to the ad service 112.

Both submission of the original URI by the user 104 and submission of the trackable recommendation identifier by the user 108 can also be recorded and analyzed by the forwarding service 102, the ad service 112, or some other means. For example, the ad service 112 may use such events in a statistical fashion to identify product/service trends, programming demographics, etc. As a specific example, the user 104 may be associated with a large number of recommendations of a television program popular among females between ages 13 and 16 (e.g., the user 104 frequently sends URLs of YouTube videos about the television programs to others). As such, an increase in recommendations by the user 104 and other similarly situated recommenders about a new television program may indicate a popular trending for the new program in the same demographic group.

Further, the user 108 can submit the trackable recommendation identifier or the original URI to the forwarding service 102 to send a recommendation message 114 containing a trackable recommendation identifier to another user 116. If the user 108 submits the trackable recommendation URI to the forwarding service 102, then the trackable recommendation identifier can provide a single level of recommendation (e.g., identifying only the user 108) or a flow of recommendations (e.g., identifying both the user 104 and the user 108). The forwarding service 102 can track the submission of user 108 as well as selection of the resulting trackable recommendation identifier by the user 116. In yet another recommendation stage, the user 116 can forward a recommendation message 118 containing a trackable recommendation identifier to another user 120. Records of all such recommendations can be maintained and/or analyzed by the forwarding service 102, the ad service 112 or other means.

It should be understood that the forwarding service 102 and/or the ad service 112 maintain recommendation data that can be used to credit the recommending and consuming users with something of value. For example, the forwarding service 102 may maintain a count of the number of consumed recommendations a recommending user has made and credit the recommending user with points towards a discounted purchase. Recommendation data may also be classified in particular product/service categories, based on timestamps, based on geographical or demographical parameters, etc. to develop a model of the marketplace relating to the recommended resources. The ad service 112 may also or alternatively maintain the recommendation data or query the forwarding service for the recommendation data, from which it can make crediting and/or incentive decisions (e.g., crediting the consuming user with a discount versus points).

In another alternative implementation, the original URI returned to the consuming user from the forwarding service 102 may also be modified to include one or more parameters to cause the network resource (e.g., the recommended website) to treat the consuming user differently than the general population. For example, the company publishing the recommended website may pay the forwarding service company a fee to map a discount parameter to the original URI. In this manner, the returned URI can include this parameter, and the web server accessed through the returned URI can redirect the consuming user to a web page that offers a discount to recommended consumers.

FIG. 1 has been described as processing a URI through a client interface (similar to an interface used to short URLs). In an alternative implementation, the recommending user can simply route the recommendation message through a forwarding service that automatically personalizes all (or a specifically marked subset) of the URIs found within the recommendation message before forwarding it on to a consuming user identified by the recommending user. In this manner, the recommending user can integrate the steps used to provide a recommendation (e.g., personalizing the URI and sending the recommendation). Furthermore, the forwarding service can also be more integrated in the recommendation procedure (e.g., it can detect when a recommendation was actually sent to a user and which user received it). Other implementations may also be employed.

The forwarding service 102 and/or the ad service 112 may reside in the cloud or be executed from a server within a local area network. For example, a forwarding service may be implemented within an email or unified communications server of an enterprise. Alternatively, an Internet or Web-based service (similar to a URL shortening service) may implement the forwarding service and/or the ad service.

In one implementation, based on the tracking of online recommendation flows, the ad service 112 allocates incentives to the participants in the online recommendation flows. As shown in FIG. 1, the ad service 112 receives recommendation flow information from the forwarding service 102 and allocates credit (represented by the "$" symbol and dashed arrows 122) based on a variety of potential factors. Note: Although the "$" symbol is used to represent a credited incentive, it should be understood that incentives need not be monetary in nature and may include any incentive of value, including recognition, messages of appreciation, etc.

A variety of incentive allocation mechanisms may be employed. For example, one implementation may apply an equal allocation among every participant in the recommendation flow. In another implementation, a varying allocation may be based on the "distance" (e.g., the number of recommendations) in the flow between the original recommending user and the consuming user, in which the incentive diminishes with a larger distance. However, more complex allocation systems may also be employed, particularly if the recommendation flow is not strictly sequential but includes multiple recommendation flow branches.

In one such allocation system, the contribution of individual recommending users in an online recommendation flow may be modeled to determine a relative level of contribution of each user to a shared outcome (e.g., a consuming user actually purchasing based on the recommendation flow). Multi-agent (or multi-user) domains, where cooperation among agents contributes to achieving a common goal, can be modeled as "coalitional games" or "cooperative games." Cooperation influences many types of interactions among self-interested agents. In many domains, individual agents (e.g., recommending users, consuming users) rely on each other to achieve the common goal. The users involved in a recommendation flow that results in a purchase, for example, may form a winning "coalition" that is eligible for some incentive.

Nevertheless, different users may be unequal in their power to affect the shared outcome. For example, a user may be considered more important in a winning coalition if the user's removal from the coalition would cause the coalition to "lose". Such a user is referred to as a "critical" user and may be attributed with a representation of more power in the coalition, therefore be deserving of a larger share of the incentive as compared to other noncritical users in the coalition. Accordingly, a cooperative game may be employed to fairly allocate the "power" and therefore the appropriate level of incentives throughout the winning coalition.

Further, the described technology may consider the various recommendations in a recommendation flow (e.g., along with their quality or assessed influence on an eventual result) by estimating the contribution of each such recommendation on the final result (e.g., the purchasing decision by the consuming user). Some of these recommendations were not communicated direction to the actual consuming user but to other recommending users within the recommendation flow that leads to the consuming user. Nevertheless, such recommending users still receive some credit for the result, as described herein.

In some implementations, the UserID of a recommending user may be considered when evaluating the effectiveness of the user's recommendations (e.g., the probability that the user's recommendation will result in a purchase or a subsequent forwarding by the recipient). For example, it is possible to augment a representation of the recommendation flow (e.g., a datastore such as a graph or table) with weights on the associations between users (e.g., on edges of a graph). Alternatively, certain conditions may be placed on recommendations before they are recognized as a successful association between two users.

Figure 2:
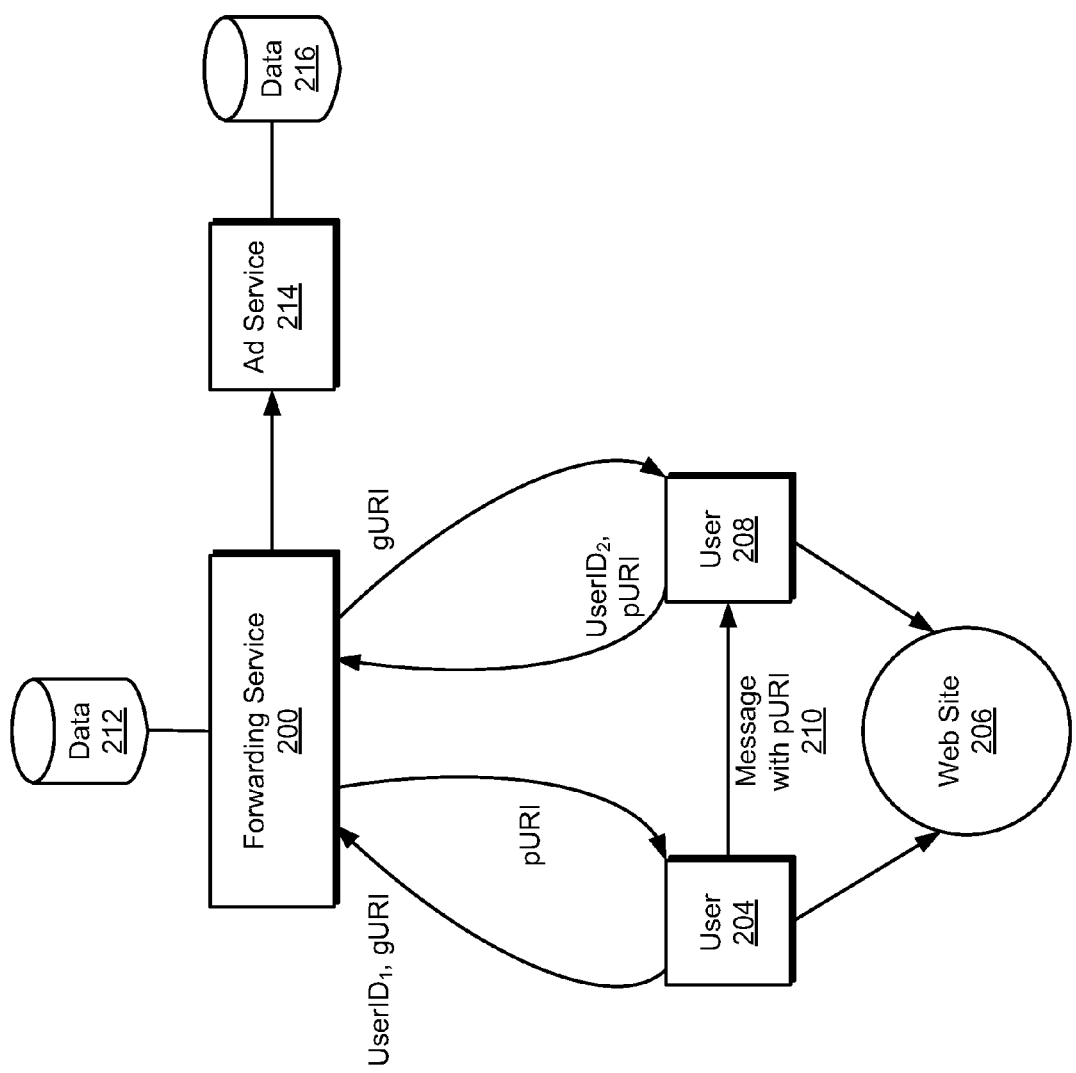
FIG. 2 illustrates an example forwarding service managing a recommendation.

FIG. 2 illustrates an example forwarding service 200 managing a recommendation. A user 204 (e.g., a "recommending user") may access a website 206 and decide to recommend it to another user 208 (e.g., a "consuming user"). In this context, the term "recommending user" identifies a user in a role of recommending a resource to another user, and the term "consuming user" identifies another user in a role of responding to a trackable recommendation by submitting a trackable recommendation identifier to the forwarding service 200. Note: The user 204 need not actually access the website 206 in order to obtain an accurate URI to the website 206, but accessing a website is a common method of obtaining an accurate URI (e.g., copying the URI from a web address field in a browser).

To recommend the website 206 to the user 208, the user 204 submits a user identifier (UserID$_1$) of the user 204 and the URI (gURI—generic URI) to the forwarding service 200. The gURI represents a recommended resource identifier. The forwarding service 200 creates a trackable recommendation identifier (pURI—personalized URI), a resource identifier mapping between the gURI and the pURI, and a user mapping between the UserID$_1$ and the pURI. The mappings are stored in a datastore 212 accessible by the forwarding service 212. The forwarding service 200 then sends the pURI back to the user 204, who sends a recommendation message 210 containing the pURI to the user 208.

Upon receipt of the recommendation message 210, the user 208 can "consume" the recommendation by triggering submission of the pURI in the recommendation message 210 (e.g., the pURI in the body of a recommendation email) and the user identifier (UserID$_2$) of the user 208 to the forwarding service 200. The forwarding service 200 records in the datastore 212 the consumption of the recommendation by the user 208 of the pURI, creates a mapping between the pURI and the UserID$_2$, finds the mapping associated with the pURI in the datastore 212, and returns the corresponding gURI to the user 208 (or redirects the user 208's browser to the resource identified by the gURI). In this manner, the user 208 can access the recommended web site 206.

By maintaining both the initial recommendation by the user 204 and the consumption of the recommendation by the user 208, the forwarding service 200, an ad service 214, or other means can track personal recommendations made online and their effectiveness. Furthermore, using the user mappings, consumed recommendations can be tracked back to the recommending user, who can be credited with a consumed recommendation and therefore rewarded with an incentive, award, or some other valuable benefit. For example, the recommending user associated with the pURI submitted by the consuming user may be awarded points that can be traded for other products or services. Records of such consumed recommendations can also be stored in and/or distributed to other datastores, such as datastore 216.

In an alternative implementation, the forwarding service 200 may also receive from the user 204 a recommendation qualifier, such as "like," "dislike," "refer," etc. For example, if the user wishes to recommend that the friend 208 avoid buying a product reviewed at a particular URI, the user 204 can attribute a "dislike" recommendation qualifier to the submission of the UserID and gURI to the forwarding service 200. The user 204 may also annotate the returned pURI with text ("This product is AWFUL!") in the recommendation message 210 before sending it to the user 208. Recommendation qualifiers may also be recorded by the forwarding service 200, stored in the datastore 212, and used by the forwarding service 200, the ad service 212, or other means to evaluate marketing trends, etc.

In yet another alternative implementation, the forwarding service 200 may also receive from the user 208 a consumption qualifier, such as "like," "dislike," "refer," "ignore," etc. For example, if the user 208 already knows about the recommended product or website or does not trust the recommendations of the user 204, the user 208 can attribute an "ignore" consumption qualifier to the submission of the UserID and pURI to the forwarding service 200. Consumption qualifiers may also be recorded by the forwarding service 200, stored in the datastore 212, and used by the forwarding service 200, the ad service 212, or other means to evaluate marketing trends, etc. Consumption qualifiers may also alter the way the forwarding service 200 responds to a consuming user's submission. For example, the forwarding service 200 may not return the gURI or redirect the user 208 to a recommended web site based on the receipt of an "ignore" consumption qualifier.

Other information may also be recorded by the forwarding service 200, including a recommending time stamp of the submission by the user 204, a consuming time stamp of the submission by the user 208, global positioning system (GPS) coordinates and other information, device type, whether the recommending user has actually purchased the recommended product/service, etc. For example, less credit may be attributed to a recommending user or a consuming user if a long period of time exists between a recommendation timestamp and a consuming timestamp. In another example, different levels of credit may be attributed to a recommending user or a consuming user depending on the geographic location of either user.

It should be understood that the trackable recommendation identifier may be sent to multiple recipients (e.g., via an email distribution list, a "tweet", a blog posting, etc.). In this circumstance, the UserID of the recommending user is mapped to the trackable recommendation identifier so that the recommending user can receive credit from individual consumptions by any number of consuming users who trigger the trackable recommendation identifier. Moreover, although each consuming user triggered the same trackable recommendation identifier, unique mappings between the UserID of each consuming user and the trackable recommendation identifier may be recorded, so that each consuming user is credited with the consumed recommendation.

Figure 3:
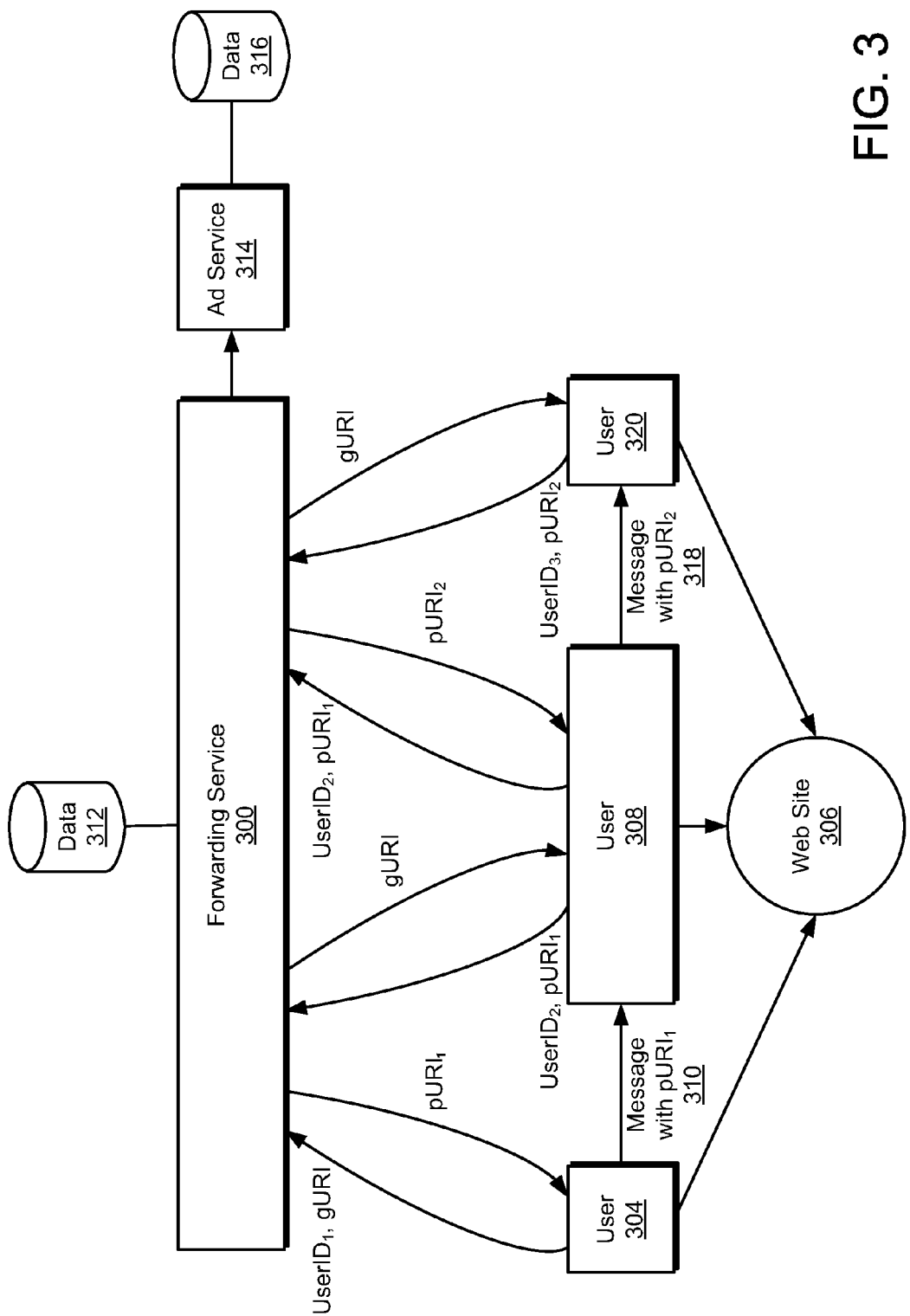
FIG. 3 illustrates an example forwarding service managing multiple recommendations in a recommendation flow.

FIG. 3 illustrates an example forwarding service 300 managing multiple recommendations in a recommendation flow. A recommending user 304 may access a website 306 and decide to recommend it to a consuming user 308.

To recommend the website 306 to the user 308, the user 304 submits a user identifier ($UserID_1$) and the URI (gURI—generic URI) to the forwarding service 300. The forwarding service 300 creates a trackable recommendation identifier ($pURI_1$), a mapping between the gURI and the $pURI_1$, and a mapping between the $UserID_1$ and the $pURI_1$. The mappings are stored in a datastore 312 accessible by the forwarding service 312. The forwarding service 300 then sends the $pURI_1$ back to the user 304, who sends a recommendation message 310 containing the $pURI_1$ to the user 308.

Upon receipt of the recommendation message 310, the user 308 can trigger submission of the pURI in the recommendation message 310 (e.g., the $pURI_1$ in the body of a recommendation email) and the user identifier ($UserID_2$) of the user 308 to the forwarding service 300. The forwarding service 300 records in the datastore 312 the consumption of the recommendation by the user 308 of the $pURI_1$, creates a mapping between the $pURI_1$ and the $UserID_2$, finds the mapping associated with the $pURI_1$ in the datastore 312, and returns the corresponding gURI to the user 308 (or redirects the user 308's browser to the resource identified by the gURI). In this manner, the user 308 can access the web site 306. By maintaining both the initial recommendation by the user 304 and the consumption of the recommendation by the user 308, the forwarding service 300 can track personal recommendations made online and their effectiveness.

In the example of FIG. 3, the user 308 also decides to recommend the website 306 to another user 320. In this context, the user 308 now takes the role of a recommending user in relation to the user 320's role as a consuming user. In one implementation, not shown in FIG. 3, the user identifier of the user 320 ($UserID_2$) and the gURI of the website 306 are submitted to the forwarding service 300, which maps and records as described previously, and returns a new trackable recommendation identifier ($pURI_2$) to the user 308. The user 308 can then send a recommendation message 318 containing $pURI_2$ to the user 320. Upon receipt of the recommendation message 318, the user 320 can submit $pURI_2$ to the forwarding service 300. The forwarding service 300 records and maps as described previously, and returns the corresponding gURI to the user 320 (or redirects the user 320's browser to the resource identified by the gURI). In this manner, the user 320 can access the recommended web site 306. In this implementation, the forwarding service 300 maintains relevant recommendation information, but only one level of recommendation.

In an alternative implementation, as shown in FIG. 3, the user 308 can submit $UserID_2$ and $pURI_1$ to the forwarding service 300, which creates a new trackable recommendation identifier ($pURI_2$), a mapping between the gURI and the $pURI_2$, a mapping between the UserID and the $pURI_2$, and a new mapping showing the multiple levels of recommendation from user 304 to user 308 to user 320. In this manner, the forwarding service 300 can track propagation of recommendations through multiple users. The forwarding service 300 then sends the $pURI_2$ back to the user 308, who sends a recommendation message 318 containing the $pURI_2$ to the user 320. The number of recommendation levels maintained by the forwarding service 300 are unlimited by the described technology.

Upon receipt of the recommendation message 318, the user 320 can trigger submission of the $pURI_2$ in the recommendation message 318 and the user identifier ($UserID_3$) of the user 320 to the forwarding service 300. The forwarding service 300 records and maps as described previously, and returns the corresponding gURI to the user 320 (or redirects the user 320's browser to the resource identified by the gURI). In this manner, the user 320 can access the recommended web site 306.

Additional information may also be received by the forwarding service 300, including timestamps, GPS coordinates and other information, recommendation qualifiers, consumption qualifiers, etc. By maintaining the recommendation by the users 304 and 308 and the consumptions by the users 308 and 320, the forwarding service 300, an ad service 314, or other means can track personal recommendations made online and their effectiveness. Records of such recommendations can also be stored in and/or distributed to other datastores, such as datastore 316.

Some benefits to the described technology include measuring the effectiveness of recommendations, determining who can influence the purchasing actions of whom, how strong is this influence, etc. Furthermore, political campaigns can use trackable online recommendations to analyze the impact of various news items, the popularity of candidates and issues, etc.

By reconstructing the flow of recommendations, a forwarding service and/or ad service can reward individuals based on the actual causal influence associated with their online recommendations. A recommending user and/or a consuming user may be credited with any valuable reward, including mere recognition, tradable/marketable points, free or reduced priced goods/services, etc.

Figure 4:
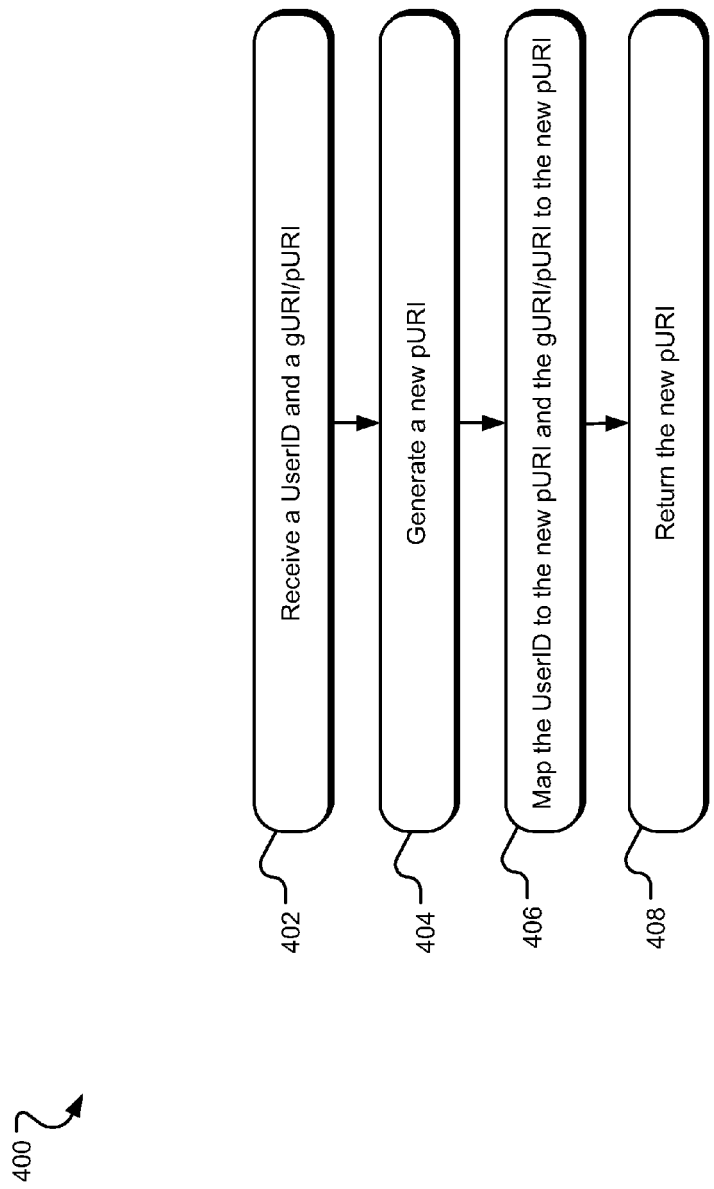
FIG. 4 illustrates example operations for a recommending phase of tracking online recommendations.

FIG. 4 illustrates example operations 400 for a recommending phase of tracking online recommendations. A receiving operation 402 receives a UserID and a gURI or pURI from a recommending user. For example, if the recommending user is recommending a previously untracked resource identifier, then the associated gURI is received via the receiving operation 402 to record the recommendation and generate a new trackable recommendation identifier (e.g., a new pURI) in a generating operation 404. In contrast, if the recommending user is recommending a previously generated trackable recommendation identifier, then the associated pURI is received via the receiving operation 402 to record the new recommendation and to generate a new trackable recommendation identifier (e.g., a new pURI) in the generating operation 404.

A mapping operation 406 maps the UserID to the new pURI and maps the received gURI or pURI to the new pURI. In this manner, the mapping allows the recommending user to be identified using the new pURI and allows the new pURI to be translated back into the gURI when the new pURI is submitted by a consuming user (i.e., the user that receives and acts on the recommendation). A sending operation 408 returns the new pURI to the recommending user.

Figure 5:
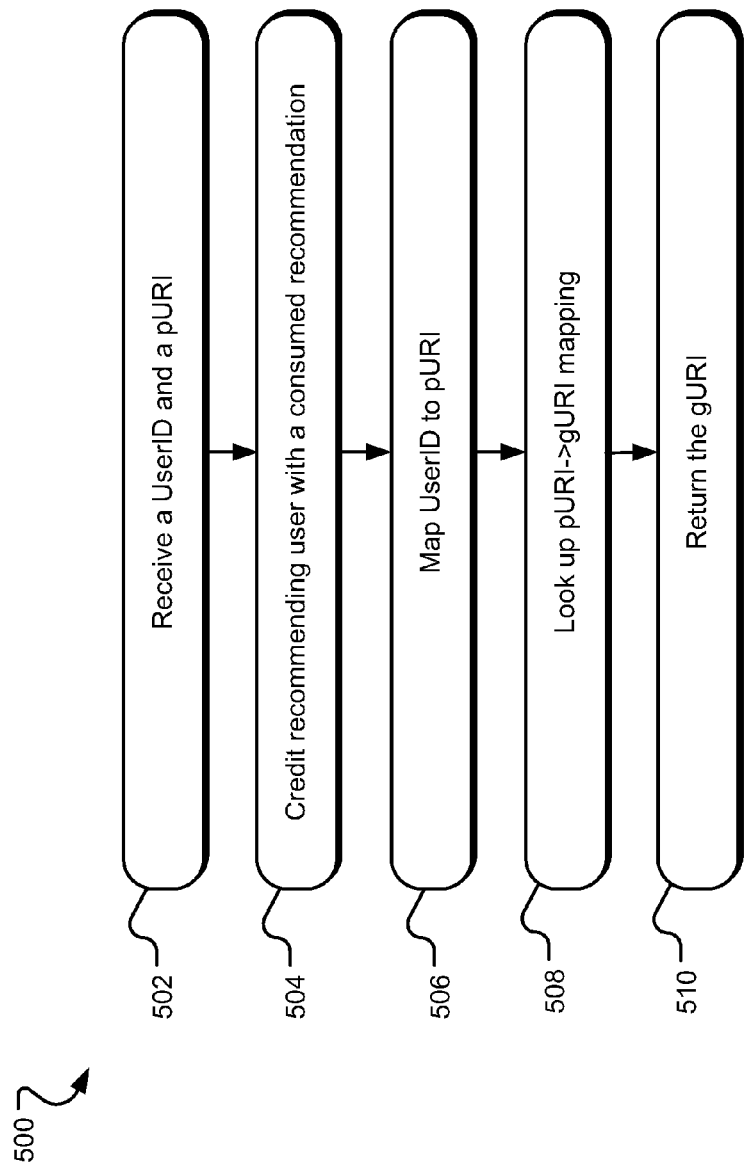
FIG. 5 illustrates example operations for a consuming phase of tracking online recommendations.

FIG. 5 illustrates example operations 500 for a consuming phase of tracking online recommendations. A receiving operation 502 receives a UserID and pURI from a consuming user. A credit operation 504 maps the received pURI to one or more recommending users based on one or more user mappings and credits such recommending users with a consumed recommendation. A mapping operation 506 maps the UserID of the consuming user to the pURI. In this manner, the mapping allows the consuming user to be identified using the pURI. In an alternative implementation, receipt and mapping of the consuming user's user identifier may be omitted.

A translation operation 508 looks up a gURI based on the pURI. In some circumstances, the translation operation 508 requires only one lookup stage (e.g., if the pURI is associated with a single level recommendation). In other circumstances, the translation operation 508 may required multiple lookup stages (e.g., if the pURI is associated with a single level recommendation). The translation operation 508 yields a gURI associated with the original recommendation, and a returning operation 510 returns the gURI to the consuming user (or redirects the consuming user's browser to the network resource identified by the gURI).

Figure 6:
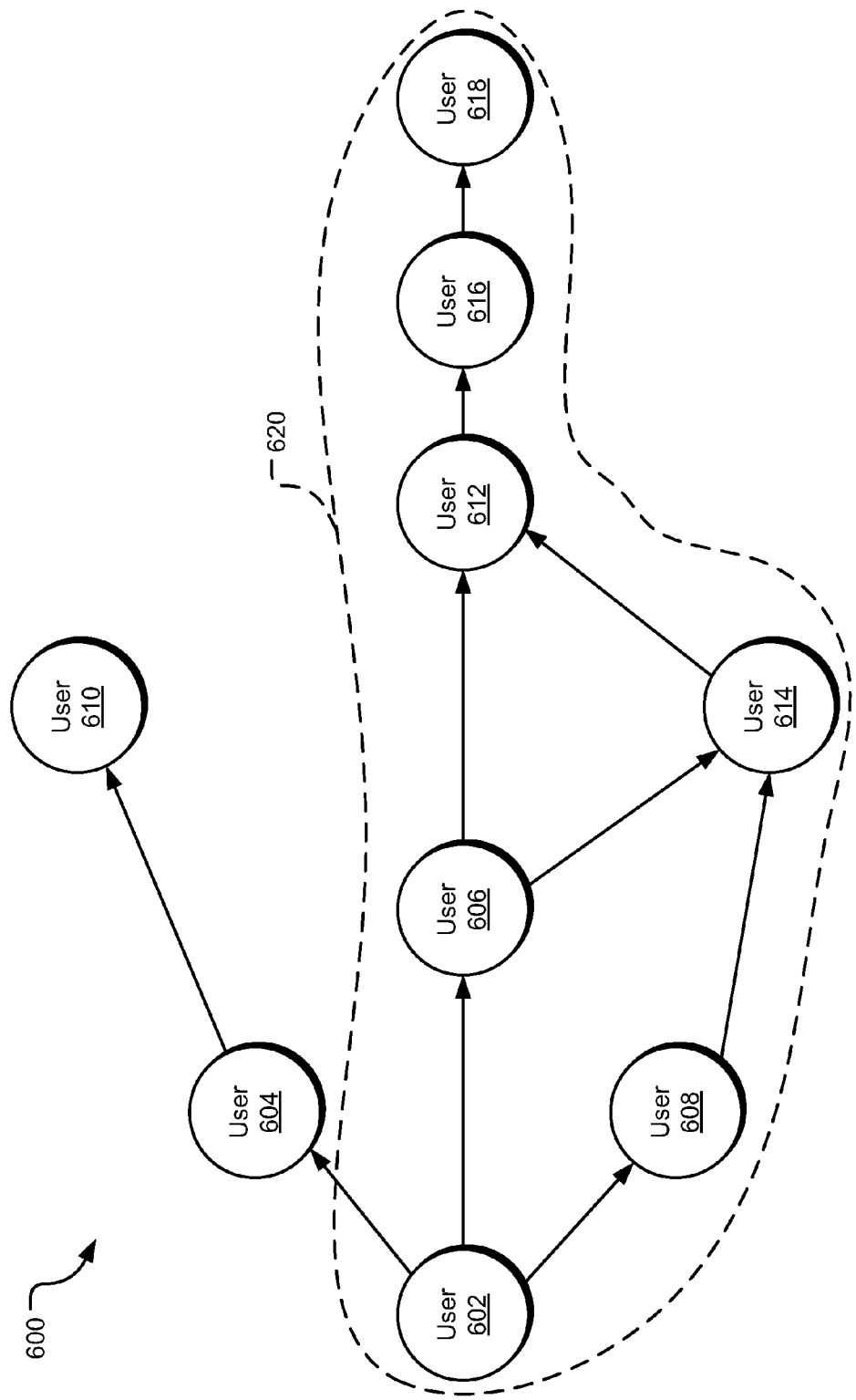
FIG. 6 illustrates a graph of an example recommendation flow.

FIG. 6 illustrates a graph 600 of an example recommendation flow, although another datastore, such as a table may be employed. An original recommending user 602 sends trackable recommendations to three users, 604, 606, and 608. A user 604 forwards the recommendation to another user 610; the user 606 forwards the recommendation to users 612 and 614; the user 608 also forwards the recommendation to the user 614. The user 614 forwards the recommendation to the user 612, who forwards the recommendation to a user 616. The user 616 forwards the recommendation to a consuming user 618, who visits the website to evaluate the product/service, purchases the recommended product/service, etc, which triggers an incentive.

In this example, the recommendations have traversed through one or more paths to the consuming user 618, who acts in a way that triggers an incentive. Such triggering actions typically represent an action that the product or service vendor is intending to generate through recommendations and is therefore willing to provide rewards for recommendations that result in the actions. Example triggering actions may include an actual purchase but may also include an evaluation of the product or service, completion of a survey, provision of contact information for a follow up sales call, etc. Based on detection of a triggering action, the ad service can identify those users in the recommendation flow that are deemed deserving of an incentive and can therefore allocate a portion of that incentive one or more of these recommending users.

As shown in FIG. 6, one of the recommendations made by the original recommending user 602 (i.e., the recommendation forwarded to the user 604) is not shown as having resulted in the triggering action performed by the consuming user 618. However, one or both of the recommendations forwarded to the user 606 and the user 608 may have contributed to the triggering action of consuming user 618, as shown by the directed arcs flowing via various branches from the user 602 to the user 618. Based on this recommendation flow, the users 602, 606, 608, 612, 614, 616, and 618 are classified as being in a coalition 620 associated with the triggering action of the consuming user 618. The coalition 620 is referred to as a "winning" coalition because it resulted in a trigger action. It should be understood that other coalitions also exists in the recommendation flow described by the graph 600, such as a coalition including users 602 and 606, another coalition including users 608, 614, and 612, another (winning) coalition including users 612, 616, and 618, etc., for a multitude of different coalitions ("cooperating combinations") of users. These descriptions of these coalitions are input to the cooperative gaming engine and influence the "power" of each user in the recommendation flow.

Based on the identified coalition 620, a description of the portion of the graph 600 within the coalition 620 is submitted to a cooperative gaming engine to determine the "power" of each user in the coalition 620 with reference to the triggering action. That is, the cooperative gaming engine determines how an incentive associated with the triggering action is to be allocated among the users in the coalition.

Generally, a cooperative game is composed of a set of n users, I, and a functional mapping of any coalition of the users to a real value $v: 2^I \to \Re$. In one implementation, $v$ is constrained to values of 0 or 1 (e.g., $v: 2^I \to \{0,1\}$), such that a coalition $C \subset I$ wins if $v(C)=1$ and loses if wins if $v(C)=0$. A user i is said to be critical in a winning coalition C if the user's removal from that coalition would make it a losing coalition. For example, the user 616 would be said to be critical in the winning coalition 620 of FIG. 6. A critical user has a strong influence on the result of the game, so this property is related to various measures of power. It should be understood that multiple users may be critical in the same coalition (see e.g., the user 612, who is also critical).

An example approach to measuring the power of individual users in a recommendation flow is the Shapley-Shubik power index, which reflects the assumption that any ordering of the users entering the coalition has an equal probability of occurring. The Shapely-Shubik index is given by $sh_i(v)=(sh_i(v), \ldots, sh_n(v))$, where $$sh_i(v) = \frac{1}{n!}\sum_{\pi \in \Pi} [v(S_\pi(i) \cup \{i\}) - v(S_\pi(i))],$$

$\pi$ denotes a permutation (reordering) of the users, so that $\pi: \{1, \ldots, n\} \to \{1, \ldots\}$ and $\pi$ is reversible, $\Pi$ denotes the set of all possible permutations, and $S_\pi(i)$ denotes the predecessors of $i$ in $\pi$, so that $S_\pi(i)=\{j|\pi(j)<\pi(i)\}$.

The naïve implementation of calculating the Shapley-Shubik power index is computationally complex and may be impractical for applying to pricing in social advertising in some contexts. For example, for n users, there are n! permutations to consider. Using Stirling's approximation, there are about $O(2^{n \log n})$ permutations to evaluate, which presents potentially intractable computation obstacles without severe limitations.

Accordingly, an implementation of the described technology seeks to approximate Shapely-Shubik power indices by randomly sampling permutations of the users. Each sample is evaluated to determine whether a user i is critical in that sample. A user i is deemed critical in the returned permutation $\pi$ (denoted as Critical($i, \pi$)) if:

$$v(S_\pi(i) \cup \{i\}) - v(S_\pi(i)) = 1$$

After several sampled permutations of users are evaluated, the Shapley-Shubik power index $sh_i(v)$ of the user i is estimated by the proportion of the sampled permutations where a user i is critical. Accordingly, the probability P that a user i is critical in a random permutation $\pi$ is represented by its Shapley-Shubik power index:

$$P_{\pi \in \Pi}(\text{Critical}(i,\pi)) = sh_i(v)$$

Given the probability P the random variable $X_j$ can be defined by letting $\pi_j$ be a random permutation, with $X_j$ being 1 if the user i is critical in $\pi_j$ and being 0 if the user i is not critical in $\pi_j$, the maximum likelihood estimator for $sh_i(v)$, where k represents the number of sample permutations, is determined by $$\hat{sh}_i(v) = \frac{X}{k}$$

A confidence interval for the estimator $\hat{sh}_i(v)$ may be computed to provide a bound on the probability that this value is approximately correct. Given the sample of $X_1, \ldots, X_k$ of k samples, a confidence interval of $[\hat{sh}_i(v)-\epsilon, \hat{sh}_i(v)+\epsilon]$ includes values that are within a distance of $\epsilon$ from the correct power index value, $sh_i(v)$ (e.g., values that are within an acceptable level of accuracy). A probability $\delta$ also is defined, representing the low probability that the correct power index $sh_i(v)$ is not within the confidence interval. Accordingly, the confidence interval is defined as centered at $\hat{sh}_i(v)$, having a width of $2 \cdot \epsilon > 0$, and containing the correct power index value, $sh_i(v)$, with a probability of at least $1-\delta$.

Using Hoeffding's inequality, relationships among the number of samples k, the confidence level $\delta$, and the "accuracy" level $\epsilon$ (i.e., the width parameter of the confidence interval), yielding:

$$\epsilon \geq \sqrt{\frac{1}{2k}\ln\frac{2}{\delta}} \text{ and } k \geq \frac{\ln\frac{2}{\delta}}{2\epsilon^2}$$

Using the estimator $\hat{sh}_i(v)$ and the confidence interval, the power of the individual users can be ranked (e.g., to allocate portions of the incentive to different users based on the power rankings). In order to rank the users according to their power indices, the users are sorted according to the intervals' centers. If no two intervals c intersect and if each interval $c_i$ contains the actual power index of the user i so that $sh_i(v) \in c_i$, the sort results in the correct rankings.

In the context of allocating an incentive to users in a recommendation flow, the power indices of all users in a winning coalition sum to one. As such, the incentive can be allocated in accordance with relative power indices. For example, if a $100 incentive is to be shared among three users of a winning coalition, wherein the three users have power indices of 0.1, 0.3, and 0.6 respectively, then the incentive would be allocated as $10 to one user, $30 to another user, and $60 to the last user.

Although a particular approximation approach is described for determining Shapley-Shubik power indices, other methods may also be employed. For example, generating functions may be used to compute power indices efficiently in some contexts. Methods for computing a Banzhaf value using multilinear extensions may be employed, and the Banzhaf value may be employed in a manner similar to the Shapley value to develop a power indices. A Shapley value may also be approximated using a Monte-Carlo approach in one implementation, and a Shapely-Shubik power index of weighted voting game may be calculated using a randomized method in another implementation. Accordingly, various detailed approaches may be employed to develop the power indices described herein.

Figure 7:
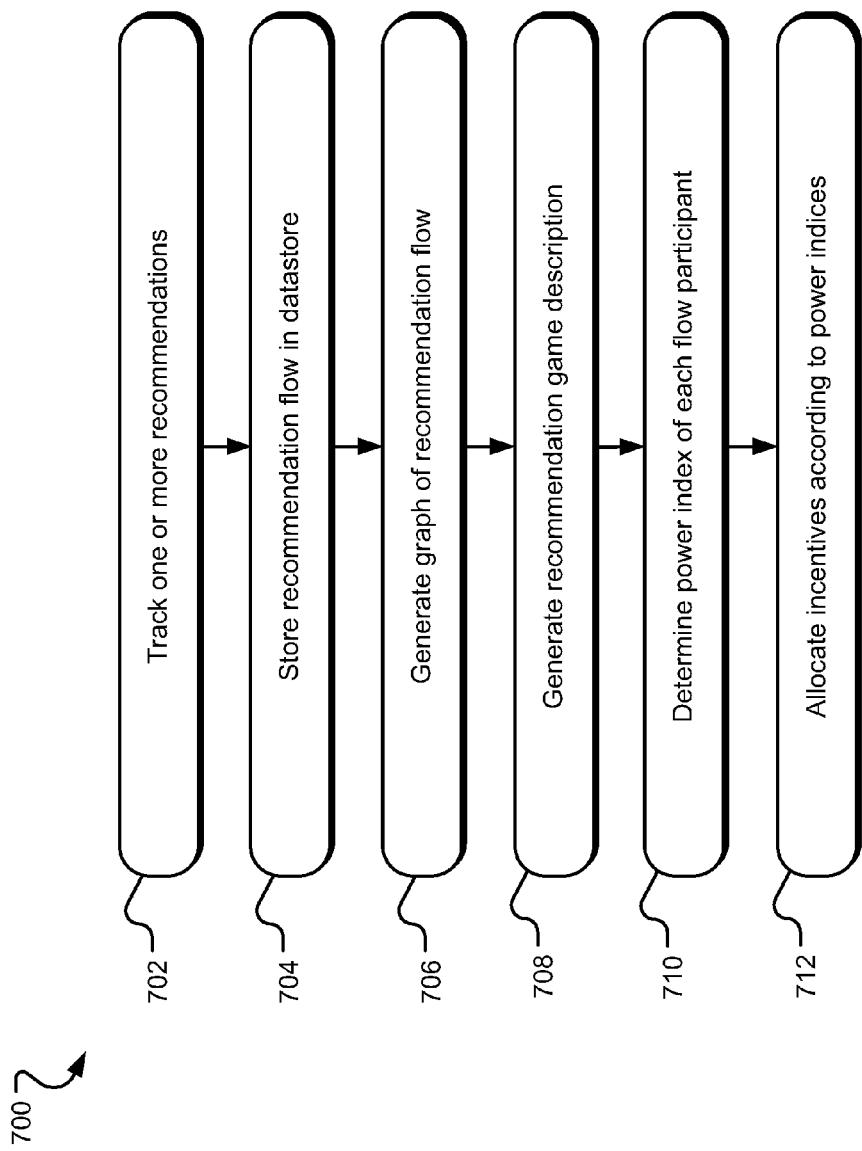
FIG. 7 illustrates example operations for allocating incentives in an online recommendation flow.

FIG. 7 illustrates example operations 700 for allocating incentives in an online recommendation flow. A tracking operation 702 tracks one or more recommendations in a recommendation flow. In one implementation, a trackable recommendation identifier may be handled and stored by a forwarding service, although other tracking techniques may be employed, such as maintaining all recommendations, tracking, and purchase handling within a single web service. A storage operation 704 stores the recommendation flow information in a datastore.

A graphing operation 706 generates a graph of the recommendation flow based on the recommendation flow information in the data store. In one implementation, each user in the recommendation flow is represented as a vertex in the graph, and each recommendation is represented as a arc or edge in the graph.

A game description operation 708 determines a winning coalition within the graph, generates an induced graph containing only the users (vertices) of the winning coalition and the recommendations (edges) that connect them, and identifies the various users as recommending users or consuming users.

Note: A cooperative game provides a mapping from coalitions to values. The value of a coalition is defined through the game description (e.g., a graph, table, etc.). In one implementation, a coalition has a value of 1 if it connects the source of the recommendation to the consuming user. In an alternative implementation, a value of a coalition is the number of recommending users connected with the consuming user in the game description. In yet another implementation, the value of the coalition is 1 if it connects the source of the recommendation to the consuming users through graph paths in which all of the edges in the path have a weight of at least 0.5. These implementations are merely examples and many other implementations may be employed.

A power index operation 710 determines the power index of each flow participant represented in the induced graph. The power index approximation described with regard to FIG. 6 provides one implementation for determining the power indices, although other brute force and approximation methods may be employed. An allocation operation 712 allocates portions of an incentive to the flow participants based on the computed power indices.

FIG. 8 illustrates an example system that may be useful in implementing the described technology. The example hardware and operating environment of FIG. 8 for implementing the described technology includes a computing device, such as general purpose computing device in the form of a gaming console or computer 20, a mobile telephone, a personal data assistant (PDA), a set top box, or other type of computing device. In the implementation of FIG. 8, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 8. The logical connections depicted in FIG. 8 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are example and other means of and communications devices for establishing a communications link between the computers may be used.

In an example implementation, a forwarding service, an ad service, and other modules and services may be embodied by instructions stored in memory 22 and/or storage devices 29 or 31 and processed by the processing unit 21. A UserIDs, mappings, recommendation qualifiers, power indices, timestamps, and other data may be stored in memory 22 and/or storage devices 29 or 31 as persistent datastores. Further, a forwarding service and an ad service represent hardware and/or software configured to provide service functionality for network-connected systems. Such services may be implemented using a general purpose computer and specialized software (such as a server executing service software), a special purpose computing system and specialized software (such as a mobile device or network appliance executing service software), or other computing configurations.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. One or more computer-readable memory devices or storage devices comprising hardware, the one or more computer-readable memory devices or storage devices encoding computer-executable instructions that, when executed by one or more processing devices, cause the one or more processing devices to perform acts comprising:
    using a trackable recommendation identifier that identifies a recommended network resource, tracking a recommendation flow among multiple computers connected by a computer network, the tracking comprising using the trackable recommendation identifier to detect sharing of one or more recommendations shared among the multiple computers across the computer network;
    generating a graph based on the tracking, the graph comprising multiple paths representing the recommendation flow among the multiple computers across the computer network, the graph including a representation of a trigger action associated with the recommended network resource and associated with a triggering user;
    in response to the trigger action, identifying a winning coalition within the graph, the winning coalition comprising winning users including a first critical user and a second critical user, the winning users associated with individual computers of the multiple computers;
    generating an induced graph of the winning coalition, the induced graph including multiple different paths from the first critical user through the second critical user to the triggering user across the computer network;
    determining power indices associated with the winning users, wherein the first critical user and the second critical user receive higher power indices than non-critical users of the winning users;
    ranking the power indices of the winning users; and
    allocating one or more incentives among the winning users in the induced graph based on the ranking of the power indices.

2. The one or more computer-readable memory devices or storage devices of claim 1 wherein the generating the induced graph comprises:
    defining a plurality of vertices in the induced graph, individual vertices representing corresponding users in the recommendation flow; and
    defining a plurality of directed edges in the induced graph, individual directed edges representing corresponding recommendations of the recommendation flow.

3. The one or more computer-readable memory devices or storage devices of claim 1 wherein:
    the determining the power indices comprises identifying the winning users as recommending users or consuming users; and
    the allocating comprises allocating the one or more incentives only among recommending users in the induced graph.

4. The one or more computer-readable memory devices or storage devices of claim 1 wherein the determining comprises:
    sampling orderings of the winning users in the induced graph;
    identifying multiple critical users in individual orderings, wherein the multiple critical users include at least the first critical user and the second critical user; and
    determining the power indices based on proportions in which the winning users are identified as critical in the individual orderings.

5. The one or more computer-readable memory devices or storage devices of claim 1 wherein the determining the power indices comprises:
    computing or approximating Shapley-Shubik power indices.

6. The one or more computer-readable memory devices or storage devices of claim 1 wherein the trackable recommendation identifier comprises a universal resource locator (URL) that maps to at least three different users including:
    a first user;
    a second user that consumes a first recommendation provided by the first user; and
    a third user that consumes a second recommendation provided by the second user.

7. The one or more computer-readable memory devices or storage devices of claim 1 wherein the ranking comprises:
    determining a confidence interval centered on an approximated power index.

8. The one or more computer-readable memory devices or storage devices of claim 1 wherein the ranking comprises:
    determining confidence intervals centered on the power indices for corresponding users in the recommendation flow; and
    sorting the confidence intervals to yield the ranking of the power indices.

9. A system comprising:
    logic configured to:
        use a trackable recommendation identifier to track a recommendation flow among multiple computers connected by a computer network, the recommendation flow being tracked by detecting sharing of one or more recommendations shared among the multiple computers across the computer network, the trackable recommendation identifier identifying a recommended network resource,
        based at least in part on the detecting, generate a datastore representing the recommendation flow among multiple users of the multiple computers, the multiple users including an original recommending user and a consuming user,
        obtain geographic locations of individual computers associated with the original recommending user and the consuming user,
        determine power indices for the multiple users in the recommendation flow based at least in part on the datastore, and
        allocate an incentive among the multiple users based on the power indices and the geographic locations of the individual computers associated with the original recommending user and the consuming user; and
    at least one processing device configured to execute the logic.

10. The system of claim 9 wherein:
    the datastore is a graph, and
    the logic is further configured to determine the power indices by designating a plurality of vertices in the graph as being within a winning coalition, individual vertices representing corresponding users in the recommendation flow,
wherein the winning coalition includes the original recommending user and the consuming user, and there are at least two recommendations in the recommendation flow between the original recommending user and the consuming user.

11. The system of claim 9 wherein:
the datastore is a graph, and
the logic is further configured to:
  determine the power indices by designating a plurality of vertices in the graph as being within a winning coalition associated with the incentive, individual vertices representing corresponding users in the recommendation flow, wherein at least one vertex in the graph is outside the winning coalition, and
  allocate the incentive only among users within the winning coalition.

12. The system of claim 9, wherein the logic is further configured to determine the power indices by:
  determining confidence intervals centered on approximated power indices for the multiple users, and
  sorting the confidence intervals to yield a ranking of the power indices of the multiple users.

13. A method performed by at least one computing device, the method comprising:
  using a trackable recommendation identifier that identifies a recommended network resource, tracking a recommendation flow among multiple computers connected by a computer network, each computer in the recommendation flow associated with a user, the tracking comprising using the trackable recommendation identifier to detect sharing of one or more recommendations shared among the multiple computers across the computer network;
  identifying a recommending user and a consuming user in the recommendation flow, the consuming user being identified by a trigger action associated with the recommended network resource;
  identifying critical recommendations and non-critical recommendations among the multiple recommendations, wherein:
    the critical recommendations provide a connection in the recommendation flow between the recommending user and the consuming user via the computer network, and
    removal of a non-critical recommendation from the recommendation flow does not break the connection between the recommending user and the consuming user;
  determining power indices for multiple users in the recommendation flow, wherein individual users associated with the critical recommendations receive higher power indices than other individual users associated with the non-critical recommendations; and
  allocating an incentive among the multiple users based on the power indices.

14. The method of claim 13 further comprising:
  defining a plurality of vertices in a graph, individual vertices representing corresponding users in the recommendation flow; and
  defining a plurality of directed edges in the graph, individual directed edges representing corresponding recommendations of the recommendation flow.

15. The method of claim 14 wherein:
  the determining power indices comprises designating individual vertices in the graph as being within a winning coalition associated with the incentive, the individual vertices representing winning users in the recommendation flow wherein at least one other vertex in the graph is outside the winning coalition; and
  the allocating comprises allocating the incentive only among the winning users.

16. The method of claim 13 wherein the allocating comprises basing an amount of the incentive on a length of time between a recommending time stamp and a consuming time stamp, wherein the amount of the incentive is larger when the length of time is shorter.

17. The method of claim 13 wherein the determining power indices comprises:
  computing Shapley-Shubik power indices.

18. The method of claim 13 wherein the determining power indices comprises:
  approximating Shapley-Shubik power indices.

19. The method of claim 13 wherein the allocating comprises:
  determining confidence intervals centered on approximated power indices for corresponding users in the recommendation flow.

20. The method of claim 13 wherein the allocating comprises:
  determining confidence intervals centered on approximated power indices for corresponding users in the recommendation flow; and
  sorting the confidence intervals to yield a ranking of the power indices of the corresponding users.

* * * * *